April 12, 1955        C. A. McMURTRY        2,705,995
METHOD OF MANUFACTURING UPHOLSTERED FURNITURE
Filed Jan. 5, 1951        2 Sheets-Sheet 1
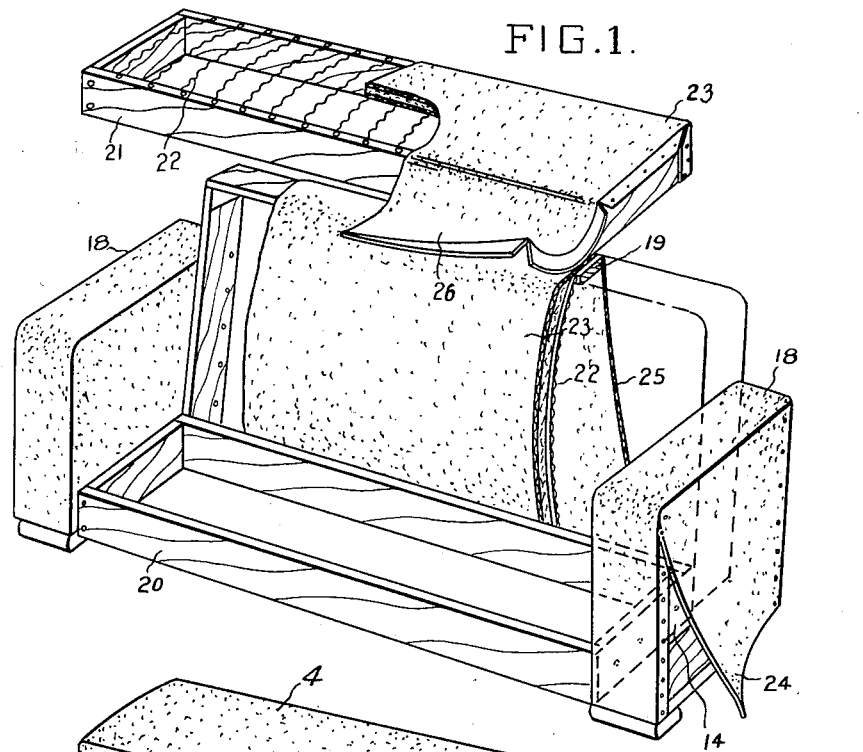
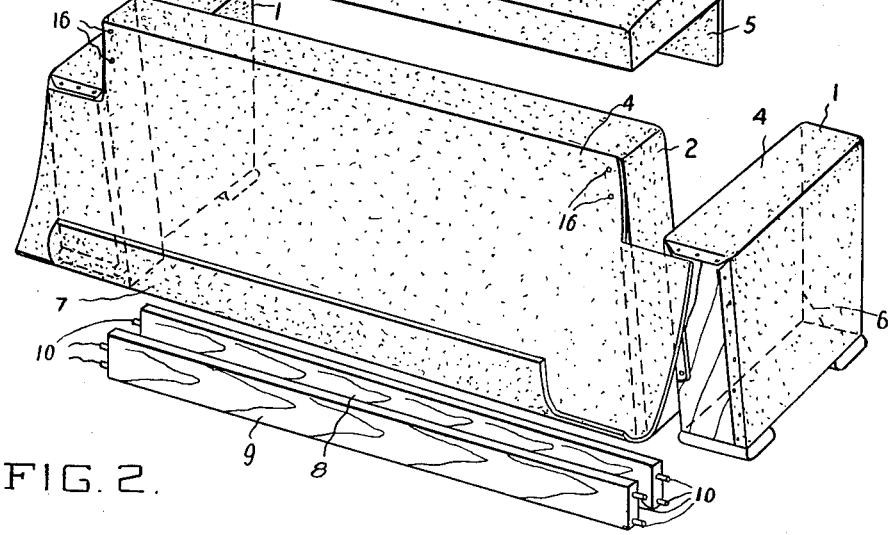
INVENTOR
CLAUDE A. McMURTRY
BY Douglas S. Johnson
ATTY.

April 12, 1955
C. A. McMURTRY
2,705,995
METHOD OF MANUFACTURING UPHOLSTERED FURNITURE
Filed Jan. 5, 1951
2 Sheets-Sheet 2
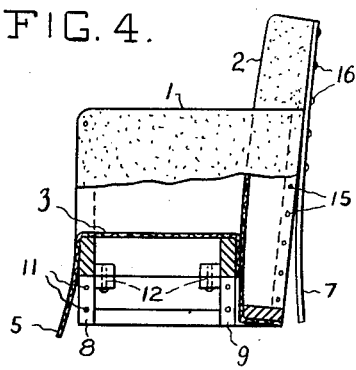
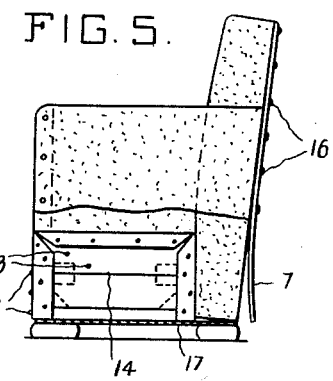
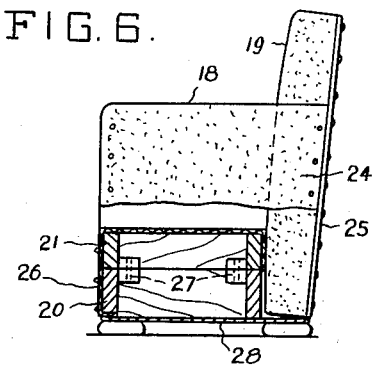
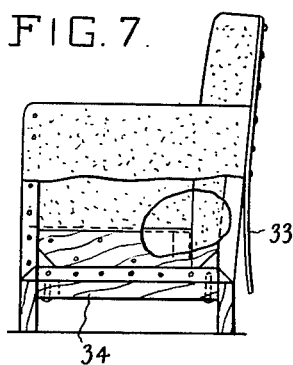
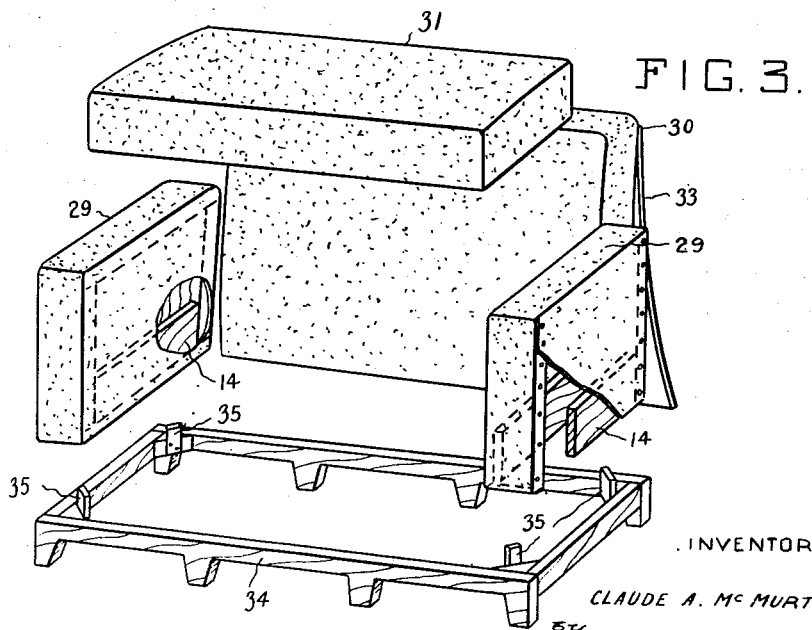
INVENTOR
CLAUDE A. McMURTRY
BY Douglas S. Johnson
ATTY.

U̇nited States Patent Office 2,705,995
Patented Apr. 12, 1955

2,705,995

METHOD OF MANUFACTURING UPHOLSTERED FURNITURE

Claude A. McMurtry, Toronto, Ontario, Canada

Application January 5, 1951, Serial No. 204,563

6 Claims. (Cl. 155—184)

This invention relates to improvements in the manufacture of upholstered furniture and the principal object is to provide an improved manufacturing method wherein production can be effected at a great saving of time with a minimum of skilled help to provide an important reduction in the cost of manufacture without in any way sacrificing the appearance of the furniture so produced.

A further and important object is to simplify the upholstering operation to a degree wherein relatively unskilled upholsterers can produce an article of furniture equivalent in appearance to the product of skilled craftsmen under present manufacturing methods.

Another vital object is to provide a very important saving in the amount of factory, working and storage space required for the manufacture of upholstered furniture enabling small factories to handle larger orders than previously possible and to enable an accumulation of a large stock with a minimum of overhead.

A still further object is to enable more workmen to work on upholstering a frame without increasing the number of frames since this method, by upholstering in smaller units of the whole, dispenses with the necessity of using a complete frame for each workman involved.

The principal feature of the invention resides in production of upholstered furniture wherein the furniture is made in component parts separately upholstered in main and brought together in the cabinet operation of assembly prior to the final upholstery operations.

A further important feature resides in the novel manner of bringing the component parts together and the manner of upholstering the parts in component form to provide for final upholstering into an integral furniture piece wherein in the step of final upholstery the assembly cabinet operations are completely concealed.

These and other objects and features will become apparent from the following description in reference to the accompanying drawings, wherein:

Figure 1 is a perspective view of a piece of furniture at the stage wherein in accordance with one embodiment of the invention the separate seat and arm and back units have been upholstered in main ready for the cabinet operation of assembly, the view showing the upholstery flaps on the seat and arm for final closing of the front and arms after assembly, parts of the view being broken away for clarity.

Figure 2 is a perspective view wherein according to another embodiment of the invention the separate seat, arms and back, independently upholstered in a manner to provide for final closing of the piece after assembly, are shown in position for assembly with front and back rails.

Figure 3 is a perspective view wherein according to still another embodiment of the invention the separate seat, arms and back independently upholstered, are shown in position for assembly with an underframe prior to the final upholstery operation following assembly.

Figure 4 is a part transverse sectional part and elevational view of the furniture piece of Figure 2 showing the subsequent step of the cabinet operation of assembly.

Figure 5 is an end elevational view of the piece of Figures 2 and 4 showing the final upholstery step of closing the piece after assembly.

Figure 6 is a part transverse sectional part end elevational view of the piece of furniture of Figure 1 illustrating the assembly cabinet and final upholstery operations.

Figure 7 is a view similar to Figure 6 but showing the final operations on the piece of furniture of Figure 3.

In the manufacture of upholstered furniture the conventional method is to form the furniture piece of a frame comprising back, arms and seat and upholstering the completed frame. The upholstering operation requires skilled upholsterers and due to the confined dimensions of the piece the number of operators that can work on the piece is very limited, usually no more than two and frequently just a single upholsterer.

The time consuming factor in the upholstering is the fitting of the material around the frame with the actual tacking or securing of the upholstery material requiring but a very small fraction of the total time taken in fitting the material smoothly and tightly around the frame.

In conventional practice the integral frame is first completed and it may be required to be stored until selection of the covering material by the customer. The result is that to create any reserve stock a very large storage space is required and requires an appreciable overhead for storage. Further, since the dimensions of the integral frames are confined, the number of operators working on the furniture piece at any stage of manufacture from initial building of the frame to complete upholstering is small, and to maintain a large production a great many pieces must be under production at the same time, requiring a large overhead in stock.

In small factories quantity of production and storage of large stocks for large orders means prohibitive overhead and invested capital. Further, because of the high cost of labour the production cost per unit is high.

Knockdown furniture has been proposed and includes both the unupholstered and upholstered furniture manufacture.

In knockdown furniture the arms and back and seat may be made separately, upholstered and shipped to the customer for assembly. The objection to such furniture is that evidence of assembly is readily detected detracting from the appearance of the piece and the cabinet operations possible to enable assembly with the furniture upholstered have prevented tying the separate frames into a solid unit, with the result that the separate frames soon work loose.

The present invention overcomes the attendant disadvantages of previous manufacturing methods by the utilization of separate frames to form the furniture piece with the inherent advantages of upholstering separate frames, while at the same time obtaining the integrality and solidness, both in structure and appearance, as obtained with the present single frame practice.

The invention will be more clearly understood with reference to the accompanying drawings wherein referring to Figure 2, according to one embodiment of the invention, the arms 1, back 2 and seat 3 are formed of separate frames. These frames individually occupy a minimum of space and may be stacked for storage after completion in readiness for the next successive step of upholstering the frame at least in main.

In Figure 2 the frames are shown as upholstered with the material 4.

It will be seen that the seat 3 is completely upholstered and the material at the front is left to provide the flap 5. The arms 1 have the upholstering material secured thereto with the exception of the rear face and the front face where the material is not fastened but is left as a flap 6 to close the interior of the arm frame. Similarly the upholstery material at the back of the back 2 is left as a loose flap 7. Figure 2 shows the furniture piece completed to this state with the component upholstered frames located in position for the subsequent step of assembly.

To assemble the component frames the front and rear rails 8 and 9 respectively are provided carrying the end dowels 10 adapted to interlock in the bores 11 in the arm frames 1.

The upholstering of the frames 1, 2 and 3 may conveniently be carried out with the frames being mounted on suitable jigs but with the frames separated no difficulty is experienced in fitting the upholstering material 4 thereto and this upholstery operation may therefore be carried out by relatively inexperienced workers.

It is important to note that the time-consuming operation of fitting the upholstering material around the complex frame of a completed furniture piece is eliminated. Moreover it will be understood that one or more operators can work on each individual component part without interference, so that for a single unit a greater number of operators may be efficiently employed than possible within the confined dimensions of an integral frame.

The next successive step in the method following the completion of the separate frames and their upholstery at least in main as separate items in the step of assembly.

In the embodiment of the invention of Figure 2 this step is depicted in Figure 4 wherein first the front and rear rails 8 and 9 are assembled in a suitable jig with the upholstered arms 1 with the dowels received in the bores 11 to tie the upholstered arms together. Then in accordance with Figure 4 the upholstered seat 3 is secured to the front and rear rails by the screws 12 and may if desired be connected by screws 13 with the cross bars 14 of the arms 1, and the upholstered back is secured in position by the screws 15.

As shown in Figure 4, by bringing the arms, seat and back into desired relation by the cabinet operation of assembly described, including the use of the rails 8 and 9, the loose flap 5 provided at the front of the seat frame 3 is arranged to overlie the front rail 8, and the loose flap 6 is arranged in position to close over and cover the joint of the arms and front rails while preventing any covering material from intervening therebetween while flap 7 of the back affords access to the interior of this latter frame for carrying out the operations required within the frame.

In the step of Figure 4 the frames are thus brought together into an integral unit having equivalent strength and solidarity as previous single frame units. In fact the employment of the separate seat frame additionally to the rails 8 and 9 affords a material strengthening action to increase the sturdiness of the unit.

The next successive step is the final upholstery step of closing the back and arm frames by securing the loose flaps 6 and 7 with tacks 16 or other suitable fastening means and closing the loose flap 5 provided on the seat over the front rail 8 and closing the bottom of the unit by the fabric or sheeting 17.

Upon the final operation all evidences of the cabinet operation of assembly are completely concealed and the appearance of the finished piece has the appearance of and in fact is an integral unit and provides a more attractive appearance in that any possibility of ill-fitting fabric folds or wrinkles are eliminated as the main upholstery operation has been carried out with all parts of the component frames completely accessible for shaping the fabric tightly thereto.

In manufacture according to this embodiment the separate frames 1, 2 and 3 and the rails 8 and 9 are made up and stored, then as desired they are upholstered in main and stored, requiring a minimum of space. Then when an order is to be filled the successive steps of the cabinet operation of assembly and the final upholstery operation are completed upon bringing the component parts together in a matter of minutes.

The furniture piece does not therefore occupy appreciable space until it is finally completed for shipping, yet none of the disadvantages of weakness, detectable cabinet work or unsightly appearance, common to knockdown furniture, are present in furniture manufactured in accordance with this invention.

It will be understood that while certain cabinet operations have been described in the assembly of the piece, these will necessarily vary to suit the particular piece being manufactured and they are by way of illustration only and not limitation.

In the embodiment of the invention illustrated in Figure 1 the arms and back 18 and 19 are tied together and formed into an integral frame by the longitudinal rail members 20, while the seat frame 21 is a separate unit.

As illustrated the back and seat frame are provided with the spring 22 and are covered with the upholstery material 23 with the seat frame being shown in position to be dropped between the arms 18.

As before, while the frames are upholstered in the main, the final upholstery operation of closing the outsides of the arms and back is not completed, leaving the loose flaps 24 and 25 respectively for access within these frame parts for the cabinet operation of assembly. Again the seat frame is provided with a loose flap extension 26 to close over the front longitudinal rail member 20 upon assembly.

Referring to Figure 6, the seat frame is dropped between the arms 18 and rigidly secured to the rail 20 by the screws 27 and may also be secured to the arms and to the back frame, access being afforded from the bottom of the unit and through the frame beneath the loose flaps 24 and 25.

The seat flap 26 is shown closed down over the longitudinal front rail 20 and following assembly the bottom of the frame is closed by the sheeting 28, the back flap 25 closed as illustrated and the arm flap 24 being shown ready for closing.

Referring to Figure 3, the arms 29, back 30 and seat 31 are shown as separate components which have been upholstered at least in main prior to assembly with the outside back of the arms open and the back open through the loose flap 33. In this instance a sub-frame 34 provided with locating and locking lugs 35 is provided to tie the component parts 29, 30 and 31 together.

As before, after making the individual frames and upholstering them in main to the condition of Figure 3 the cabinet operation of assembly is carried out before final upholstering as illustrated in Figure 7. This figure shows the piece after assembly and with the final upholstery partially completed with the outside flap 33 of the back ready for securing in position.

In both the structures of Figures 6 and 7 it will be seen that the use of the separate seat frame increases the strength of the furniture piece by adding a rigid spacing frame between the arms additionally to longitudinal members constituting the rails 20 in Figure 6 and the longitudinal sides of the sub-frame 34 in Figure 7.

While the method illustrated in Figures 1 and 6 and 3 and 7 do not permit of stacking and storing to the same degree as the method depicted in Figures 2, 4 and 5, nevertheless the removal of the seat frame in Figure 1 and the forming of the separate arms, seat and back frames of Figure 3 permit convenient and rapid upholstering by a number of operators working on the same unit, and in assembly by providing for assembly within the frames as described the unit can be brought into an integral solid piece, yet by having the final upholstering operation following assembly the final appearance of the furniture bears no evidence of assembly and has all the style and completeness of conventional furniture with an appreciable saving of cost and time in manufacture.

What I claim as my invention is:

1. The steps in the method of manufacturing upholstered furniture consisting of forming a piece of furniture of component frames, at least partially upholstering said component frames while leaving openings giving access to the interior of certain of said frames and providing flap extensions of the upholstering material for the closing of the openings to the interior of said frames on assembly, assembling and screw fastening said frames together by cabinet work performed through said access openings, and finally completing upholstering with said flaps closing said access openings and concealing said cabinet work.

2. The method of manufacture of upholstered furniture comprising the steps of forming a piece of furniture of component frames, at least partially upholstering said component frames but leaving an opening having access to the interior of at least one of said frames and providing a section of the upholstery material free on said latter frame to cover said access opening on assembly, permitting assembling and screw fastening said frames together in a cabinet operation performed through said opening, and finally completing upholstery of said frames to close said access opening and conceal the cabinet operation to provide an integral screw-connected upholstered piece.

3. The method of manufacture of upholstered furniture, consisting of the steps of making as separate frames the seat and the arms and back, upholstering the separate frames independently up to closing of the outside of the back and/or arms to leave an opening giving access to the interior thereof, assembling and screw fastening the upholstered frames into an integral unit through the access opening provided and closing the access opening of the back and/or arms following assembly.

4. The steps in the manufacture of a piece of upholstered furniture consisting of forming as separate frames the arms, the seat and the back, at least partially upholstering the arms and back while leaving upholstering material free at the outsides of at least one of said arms and back to provide an opening giving access to the interior thereof and providing a flap extension on the front of said seat, assembling in a cabinet operation said back and arms on front and back rails bridging between said arms and assembling in a cabinet operation said seat with said arms and back and rails through access opening where said upholstering material is free with said seat extending in reinforcing parallelism with said rails between said arms, said cabinet operation including screw fastening said frames and rails to rigidly connect said seat and rails to said arms, and finally completing upholstering of said arms and back to conceal said cabinet operations and close the access opening and closing said seat flap over said front rail.

5. The steps in the method of manufacture of upholstered furniture consisting of forming as separate frames the seat, the arms and the back, upholstering said frames separately while leaving portions of upholstery material at the outside of said back free to provide an opening through the upholstery for access therewithin, assembling said frames into an integral structure on a sub-frame in a cabinet operation including the operation of screw fastening performed through said access opening within said back frame and from beneath said seat frame to form an integral unit with said seat and sub-frame extending in reinforcing parallelism between and being rigidly secured to said arms, and finally closing said free upholstery portions over the frames and access opening and concealing said cabinet operations.

6. The steps in the method of manufacturing upholstered furniture consisting in forming as separate rigid frames the seat, the arms and the back, upholstering said frames separately while leaving portions of the upholstery material at the outside of said frames where upholstering can be conveniently completed upon assembly of said frames free to provide openings for access within said frames, assembling said frames by means of an understructure comprising longitudinal rails bridging said arms in reinforcing parallelism with said seat frame and securing said frames and rails into an integral structure by means of a cabinet operation comprising screw fastening performed at least in part through said openings, and finally closing said free upholstery portions over the openings to the interior of the frames to conceal evidence of the cabinet operation.

References Cited in the file of this patent
UNITED STATES PATENTS

| Number | Name | Date |
| --- | --- | --- |
| 851,067 | Coffman | Apr. 23, 1907 |
| 1,478,640 | Coverly | Dec. 25, 1923 |
| 2,145,669 | Thompson | Jan. 31, 1939 |
| 2,151,985 | Munroe | Mar. 28, 1939 |
| 2,334,966 | Thompson | Nov. 23, 1943 |
| 2,597,860 | Gerber | May 27, 1952 |